US008897546B2

(12) United States Patent
Ren et al.

(10) Patent No.: US 8,897,546 B2
(45) Date of Patent: Nov. 25, 2014

(54) SEMI-GLOBAL STEREO CORRESPONDENCE PROCESSING WITH LOSSLESS IMAGE DECOMPOSITION

(71) Applicant: Texas Instruments Incorporated, Dallas, TX (US)

(72) Inventors: Jing-Fei Ren, Plano, TX (US); Manish Goel, Plano, TX (US); Branislav Kisacanin, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 254 days.

(21) Appl. No.: 13/632,405

(22) Filed: Oct. 1, 2012

(65) Prior Publication Data

US 2013/0083994 A1 Apr. 4, 2013

Related U.S. Application Data

(60) Provisional application No. 61/540,598, filed on Sep. 29, 2011.

(51) Int. Cl.
*G06K 9/00* (2006.01)
*G06T 7/00* (2006.01)

(52) U.S. Cl.
CPC ............ *G06T 7/0075* (2013.01); *G06T 7/0022* (2013.01); *G06T 2207/10021* (2013.01); *G06T 2207/20021* (2013.01)
USPC ............................................ 382/154; 348/42

(58) Field of Classification Search
USPC .......................... 382/154, 285; 345/419–427; 356/12–14; 348/42–60
See application file for complete search history.

(56) References Cited

U.S. PATENT DOCUMENTS

| | | | |
|---|---|---|---|
| 7,512,262 B2 * | 3/2009 | Criminisi et al. ............ | 382/154 |
| 7,570,804 B2 * | 8/2009 | Kim et al. ..................... | 382/154 |
| 8,634,637 B2 * | 1/2014 | Hirschmueller et al. ..... | 382/154 |
| 8,644,599 B2 * | 2/2014 | El Dokor ...................... | 382/159 |
| 2012/0002866 A1 | 1/2012 | Hirschmueller et al. | |
| 2013/0070052 A1 * | 3/2013 | Yamashita et al. ............ | 348/43 |
| 2013/0083994 A1 * | 4/2013 | Ren et al. ...................... | 382/154 |
| 2013/0089269 A1 * | 4/2013 | Barnum et al. ............... | 382/261 |

OTHER PUBLICATIONS

Heiko Hirschmüller, "Accurate and Efficient Stereo Processing by Semi-Global Matching and Mutual Information," IEEE Computer Society Conference on Computer Vision and Pattern Recognition, vol. 2, Jun. 20-25, 2005, pp. 807-814.

(Continued)

*Primary Examiner* — Aaron W Carter
(74) *Attorney, Agent, or Firm* — Mirna Abyad; W. James Brady; Frederick J. Telecky, Jr.

(57) ABSTRACT

A method for disparity cost computation for a stereoscopic image is provided that includes computing path matching costs for external paths of at least some boundary pixels of a tile of a base image of the stereoscopic image, wherein a boundary pixel is a pixel at a boundary between the tile and a neighboring tile in the base image, storing the path matching costs for the external paths, computing path matching costs for pixels in the tile, wherein the stored path matching costs for the external paths of the boundary pixels are used in computing some of the path matching costs of some of the pixels in the tile, and computing aggregated disparity costs for the pixels in the tile, wherein the path matching costs computed for each pixel are used to compute the aggregated disparity costs for the pixel.

16 Claims, 5 Drawing Sheets

(56) References Cited

OTHER PUBLICATIONS

Heiko Hirschmüller, "Semi-Global Matching—Motivation, Developments and Applications," Photogrammetric Week, Stuttgart, Germany, Sep. 2011, pp. 173-184.

D. Marr and E. Hildreth, "Theory of Edge Detection," Proceedings of the Royal Society of London, Series B, Biological Sciences, vol. 207, No. 1167, Feb. 29, 1980, pp. 187-217.

Ramin Zabih and John Woodfill, "Non-parametric Local Transforms for Computing Visual Correspondence," Proceedings of European Conference on Computer Vision, Stockholm, Sweden, May 1994, pp. 151-158.

Filip Mroz and Toby P. Breckon, "An Empirical Comparison of Real-Time Dense Stereo Approaches for Use in the Automotive Environment," EURASIP Journal on Image and Video Processing 2012, Mar. 16, 2012, pp. 1-40.

Simon Hermann et al, "Half-Resolution Semi-Global Stereo Matching," 2011 IEEE Intelligent Vehicles Symposium, Baden-Baden, Germany, Jun. 5-9, 2011, pp. 201-206.

Heiko Hirschmüller et al, "Memory Efficient Semi-Global Matching," ISPRS Annals of the Photogrammetry, Remote Sensing and Spatial Information Sciences, vol. I-3, 2012, Melbourne, Australia, Aug. 25-Sep. 1, 2012, pp. 371-376.

Soo-Chang Pei and Ji-Hwei Horng, "Design of FIR Bilevel Laplacian-of-Gaussian Filter," Journal Signal Processing, vol. 82, Issue 4, Apr. 2002, pp. 677-691.

Christian Banz et al, "Real-Time Stereo Vision System Using Semi-Global Matching Disparity Estimation: Architecture and FPGA-Implementation," 2010 International Conference on Embedded Computer Systems (SAMOS), Jul. 19-22, 2010, Samos, Greece, pp. 93-101.

Stefan K. Gehrig et al, "A Real-Time Low-Power Stereo Vision Engine Using Semi-Global Matching," ICVS '09 Proceedings of the 7th International Conference on Computer Vision Systems: Computer Vision Systems, Oct. 13-15, 2009, Liege, Belgium, pp. 134-143.

Cosmin D. Pantilie and Sergiu Nedevschi, "SORT-SGM: Subpixel Optimized Real-Time Semiglobal Matching for Intelligent Vehicles," IEEE Transactions on Vehicular Technology, vol. 61, No. 3, Mar. 2012, pp. 1032-1042.

Heiko Hirschmüller, "Stereo Processing by Semiglobal Matching and Mutual Information," IEEE Transactions on Pattern Analysis and Machine Intelligence, vol. 30, No. 2, Feb. 2008, pp. 328-341.

\* cited by examiner

SEMI-GLOBAL STEREO CORRESPONDENCE PROCESSING WITH LOSSLESS IMAGE DECOMPOSITION

CROSS-REFERENCE TO RELATED APPLICATIONS

This application claims benefit of U.S. Provisional Patent Application Ser. No. 61/540,598, filed Sep. 29, 2011, which is incorporated herein by reference in its entirety.

BACKGROUND OF THE INVENTION

1. Field of the Invention

Embodiments of the present invention generally relate to semi-global stereo correspondence processing with lossless image decomposition.

2. Description of the Related Art

Objects at different depths in the scene of a stereoscopic video sequence will have different displacements, i.e., disparities, in left and right frames of the stereoscopic video sequence, thus creating a sense of depth when the stereoscopic images are viewed on a stereoscopic display. The term disparity refers to the shift that occurs at each pixel in a frame between the left and right images due the different perspectives of the cameras used to capture the two images. The amount of shift or disparity may vary from pixel to pixel depending on the depth of the corresponding 3D point in the scene.

In many stereo vision applications, it is important to know the depths of objects in a scene. The depth information for a stereo frame or image is typically computed from the disparities between the pixels in the left image and corresponding pixels in the right image because depth is proportional to the reciprocal of the disparity. One technique used for disparity determination that may be used in stereo vision applications is the semi-global matching (SGM) technique described in H. Hirschmüller, "Accurate and Efficient Stereo Processing by Semi-Global Matching and Mutual Information," IEEE Computer Science Conference on Computer Vision and Pattern Recognition, Vol. 2, Jun. 20-25, 2005, pp. 807-814 (Hirschmüller herein) and H. Hirschmüller, "Stereo Processing by Semi-Global Matching and Mutual Information," IEEE Transactions on Pattern Analysis and Machine Intelligence, Vol. 30, No. 2, February 2008, pp. 328-341 (Hirschmüller2008 herein), which are incorporated by reference herein. This technique provides results that are qualitatively comparable to global matching techniques with reduced computational complexity.

SUMMARY

Embodiments of the present invention relate to methods, apparatus, and computer readable media for semi-global stereo correspondence processing with lossless image decomposition. In one aspect, a method for disparity cost computation for a stereoscopic image is provided that includes computing path matching costs for external paths of at least some boundary pixels of a tile of a base image of the stereoscopic image, wherein a boundary pixel is a pixel at a boundary between the tile and a neighboring tile in the base image, storing the path matching costs for the external paths, computing path matching costs for pixels in the tile, wherein the stored path matching costs for the external paths of the boundary pixels are used in computing some of the path matching costs of some of the pixels in the tile, and computing aggregated disparity costs for the pixels in the tile, wherein the path matching costs computed for each pixel are used to compute the aggregated disparity costs for the pixel.

In one aspect, an apparatus is provided that includes means for capturing a stereoscopic image, and means for computing aggregated disparity costs for a base image of the stereoscopic image. The means for computing aggregated disparity costs is configured to compute path matching costs for external paths of at least some boundary pixels of a tile of the base image, wherein a boundary pixel is a pixel at a boundary between the tile and a neighboring tile in the base image, store the path matching costs for the external paths, compute path matching costs for pixels in the tile, wherein the stored path matching costs for the external paths of the boundary pixels are used in computing some of the path matching costs of some of the pixels in the tile, and compute aggregated disparity costs for the pixels in the tile, wherein the path matching costs computed for each pixel are used to compute the aggregated disparity costs for the pixel.

In one aspect, a non-transitory computer readable medium is provided that stores software instructions. The software instructions, when executed by a processor, cause the performance of a method for disparity cost computation for a stereoscopic image. The method includes computing path matching costs for external paths of at least some boundary pixels of a tile of a base image of the stereoscopic image, wherein a boundary pixel is a pixel at a boundary between the tile and a neighboring tile in the base image, storing the path matching costs for the external paths, computing path matching costs for pixels in the tile, wherein the stored path matching costs for the external paths of the boundary pixels are used in computing some of the path matching costs of some of the pixels in the tile, and computing aggregated disparity costs for the pixels in the tile, wherein the path matching costs computed for each pixel are used to compute the aggregated disparity costs for the pixel.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
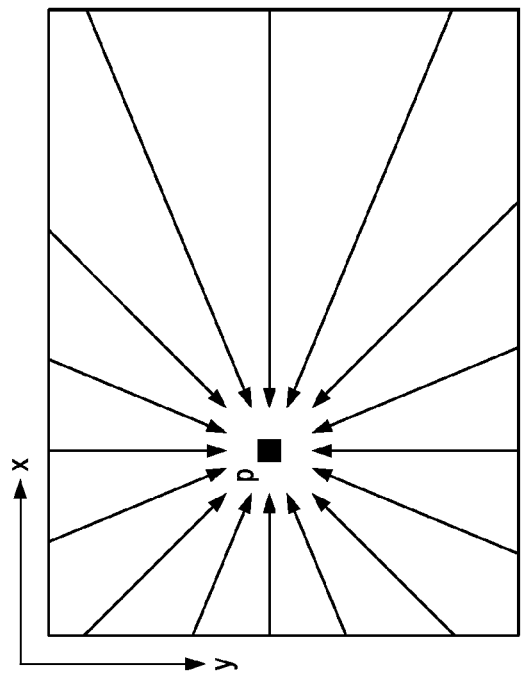
FIG. 1 is a diagram illustrating semi-global matching for a pixel.

Specific embodiments of the invention will now be described in detail with reference to the accompanying figures. Like elements in the various figures are denoted by like reference numerals for consistency.

As previously mentioned, the semi-global matching (SGM) technique of Hirschmüller may be used for disparity determination in stereo vision applications. In general, in SGM, matching costs are computed for each disparity at each pixel in a stereo image. Then, for each pixel and disparity, a pathwise aggregation of the matching costs is performed along several paths in all directions from the edges of the image to the pixel. Each pathwise cost computation represents the cost for reaching the pixel with a given disparity. The number of paths used may vary. Hirschmüller suggests that a minimum of eight paths is needed and that sixteen paths should be used. FIG. 1 illustrates sixteen paths. For each pixel and each disparity, the pathwise costs are summed to generate an aggregated cost for each disparity. Then, for each pixel the disparity with the smallest aggregated cost is selected.

More formally, a matching cost $C(p,d)$, also referred to as a dissimilarity cost or a similarity cost, is computed for each pixel p in a base image (for each disparity d) of a stereo image and a corresponding pixel in a matching image of the stereo image. The matching cost measures the dissimilarity between corresponding pixels in the left and right images of the stereo images. For computation of the matching cost, one of the left and right images is used as the base image and the other is used as the match image. Hirschmüller suggests using a cost function based on absolute minimum difference in intensities or mutual information (MI). These cost functions are described in Hirschmüller.

The matching costs for each pixel p (for each disparity d) are aggregated along several one-dimensional paths across the image to compute a path matching cost for each disparity. As illustrated in FIG. 1, the paths are projected as straight lines across the base image from a pixel at the edge of the image to the pixel p. The path matching cost $L_r(p,d)$ for a path r may be computed recursively as per Eq. 1.

$$L_r(p, d) = C(p, d) + \min[L_r(p - r, d), L_r(p - r, d - 1) + P_1,$$
$$L_r(p - r, d + 1) + P_1, \min_i L_r(p - r, i) + P_2] - \min_k L_r(p - r, k) \quad (1)$$

For each path r, the computation begins with the pixel at the edge of the image and ends with the pixel p. The first term of Eq. 1 is the matching cost of a pixel in the path r. The second term adds the lowest cost of the previous pixel p-r in the path r including a penalty $P_1$ for disparity changes and a penalty $P_2$ for disparity continuities. The penalty $P_1$ is an empirically determined constant and the penalty $P_2$ is adapted to the image content. The last term prevents constantly increasing path matching costs by subtracting the minimum path matching cost of the previous pixel from the whole term.

The aggregated cost $S(p,d)$ for each pixel at each disparity is computed as the sum of the path matching costs for the disparity as per Eq. 2.

$$S(p, d) = \sum_r L_r(p, d) \quad (2)$$

The disparity image Db corresponding to the base image is determined by selecting for each pixel p the disparity d yielding the minimum cost, i.e., $\min_d S(p,d)$.

While SGM provides robust results due to cost computations across the entire image, these cost computations result in high memory bandwidth for storing of intermediate results such as matching costs and path matching costs for all pixels/disparities in an image, and irregular data access patterns. Also, a large amount memory is needed. This creates challenge for embedded systems implementations. The amount of memory needed may be too large to be cost effectively provided as on-chip memory. Off-chip memory such as dynamic random access memory (DRAM) may be used to solve the capacity issue but the available bandwidth and sequential access patterns of off-chip memory may limit throughput. The throughput may be particularly limited when the access pattern is irregular such as that for cost aggregation in SGM in which pixels are traversed in horizontal, vertical, and diagonal directions. Further, frequent accesses to off-chip memory increase power consumption.

Figure 5A:
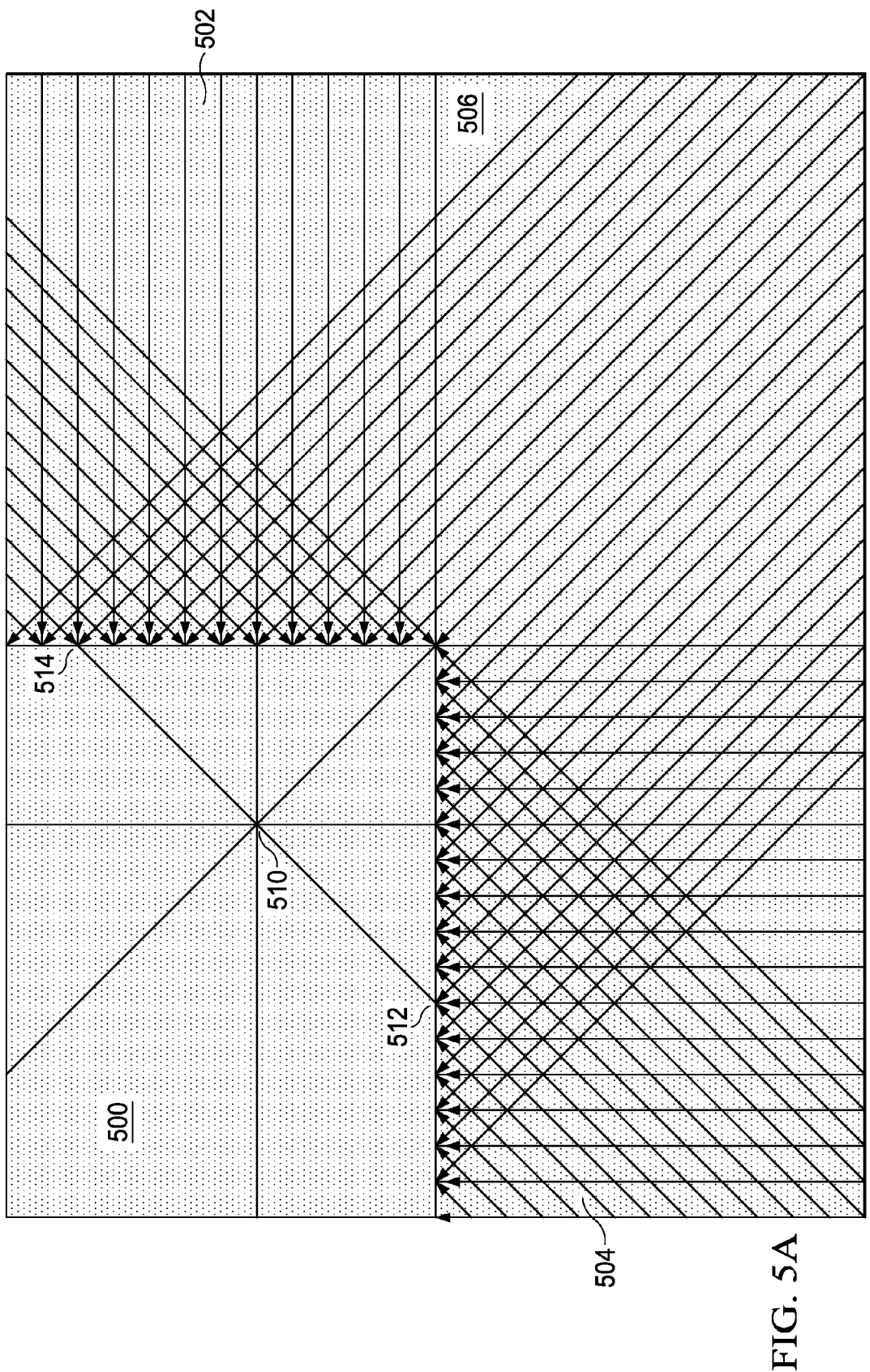
Figure 5B:
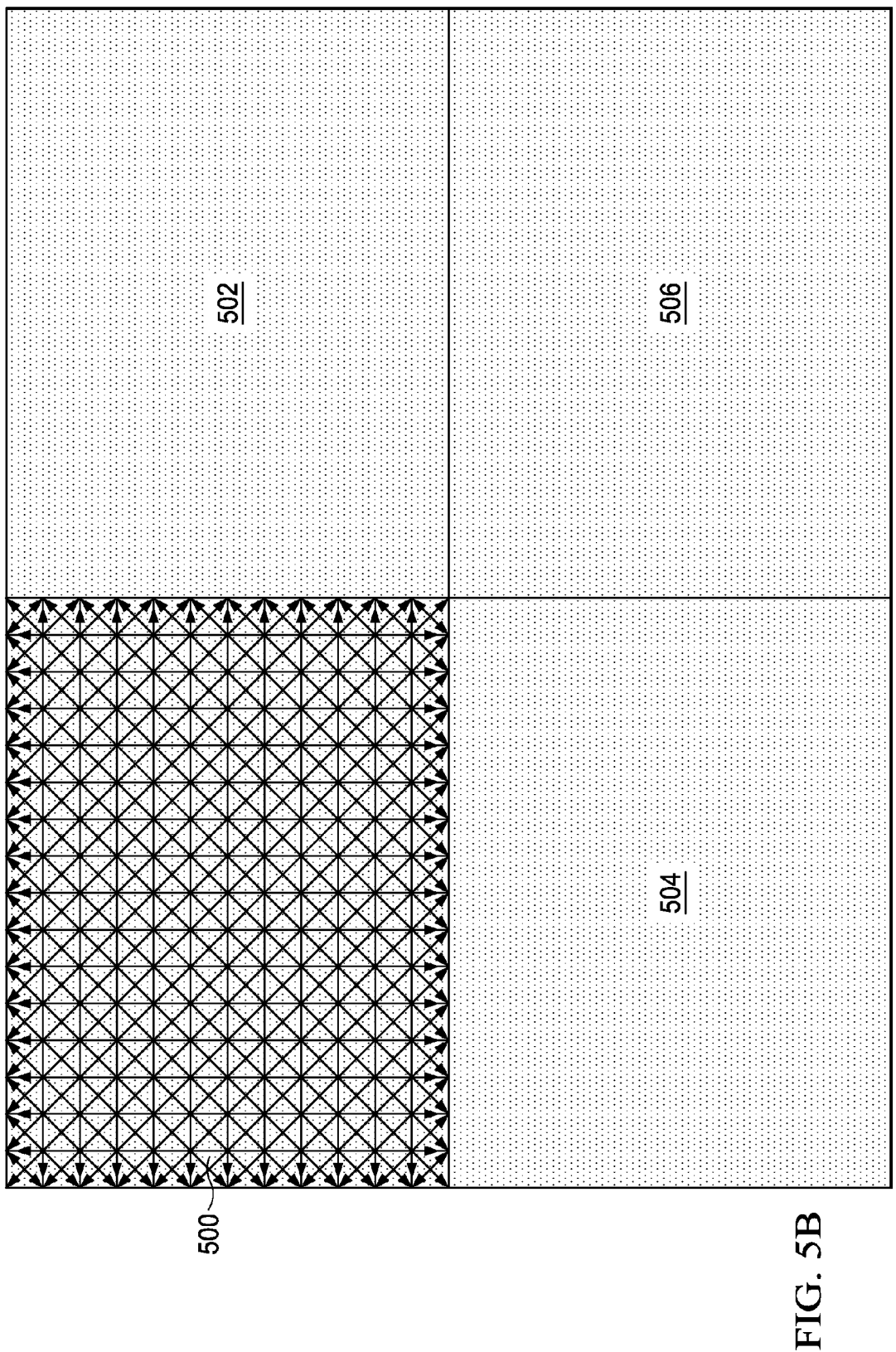

Embodiments of the invention provide for SGM with lossless image decomposition. More specifically, rather than performing SGM across an entire stereo image, the stereo image is decomposed into tiles and the SGM computations (pixel matching cost, path matching cost, and aggregated disparity cost) are performed on a tile-by-tile basis. As can be seen in the example of FIGS. 5A and 5B, for a given tile, the information needed to perform the SGM computations for pixels in the tile is available except for the boundary pixels and the paths that pass through those boundary pixels to image edges outside the tile. One or more of the paths for the path matching cost computations for the boundary pixels are external to the tile. To ensure that no information is lost by this decomposition, path matching costs for those paths external to a tile are computed and stored for pixels at the boundaries of a tile prior to performing the SGM computations on the tile.

This lossless decomposition form of SGM may be used to reduce the memory size requirements at the expense of modestly increased computational complexity due to the re-computation of some of the intermediate results, e.g., matching costs. Large images may be decomposed into smaller tiles such that an entire tile may be stored in on-chip memory as well as some or all of the intermediate SGM computation results for the tile, thus reducing the memory bandwidth requirements. Further, less memory is needed for storing intermediate results as the SGM computations are performed on subsets of an image rather than on the entire image. In some embodiments, during the processing of each tile, the movement of data to and from off-chip memory may be performed sequentially as much as possible to make efficient use of the bandwidth of the off-chip memory.

Figure 2:
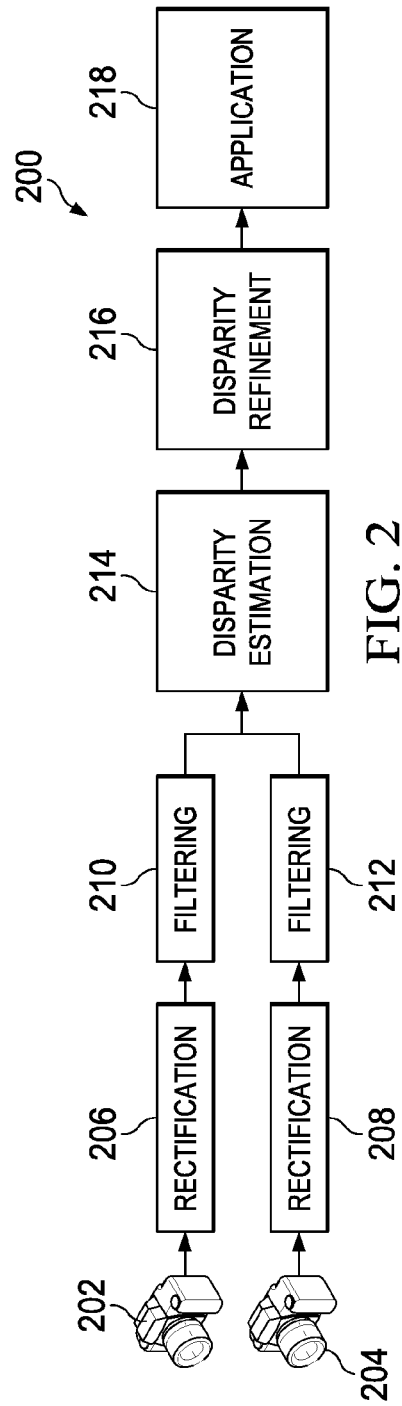
FIG. 2 is a block diagram of a stereo image processing system.

FIG. 2 is a block diagram of a stereo image processing system 200. The system 200 includes left and right imaging components (cameras) 202, 204, two rectification components 206, 208, two filtering components 210, 212, a disparity estimation component 214, a disparity refinement component 216, and an application component 218. The components of the stereo image processing system 200 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory (not shown) and executed by one or more processors.

The left and right imaging components 202, 204 include imaging sensor systems arranged to capture image signals of a scene from a left viewpoint and a right viewpoint. That is, the imaging sensor system of the left imaging component 202 is arranged to capture an image signal from the left viewpoint, i.e., a left analog image signal, and the imaging sensor system of the right imaging component 204 is arranged to capture an image signal from the right view point, i.e., a right analog image signal. Each of the imaging sensor systems may include a lens assembly, a lens actuator, an aperture, and an imaging sensor. The imaging components 202, 204 also include circuitry for controlling various aspects of the operation of the respective image sensor systems, such as, for example, aperture opening amount, exposure time, etc. The imaging components 202, 204 also include functionality to convert the respective left and right analog image signals to left and right digital image signals, and to provide the left and right digital image signals to the respective rectification components 206, 208.

The rectification components 206, 208 process the respective left and right digital images to align the epipolar lines to be parallel with the scan lines of the images. This rectification is performed to compensate for camera distortions such as lens distortion, sensor tilting, and offset from the focal axis and for image planes that are not co-planar and/or not row aligned as the result of a non-ideal camera pair set up. Any suitable rectification techniques may be used, such as, e.g., bilinear interpolation or spline interpolation. The particular rectification processing performed may depend on the application 218 using the stereo images.

The filtering components 210, 212 filter the respective rectified left and right images to improve the images for the stereo matching process performed by the disparity estimation component 214. The filtering performed may, for example, filter out the low frequency image signal that tends to capture undesired illumination and exposure differences between the cameras, amplify the high frequency texture of the scene, and reduce the effects of image sensor noise. Any suitable filter or filters may be used. For example, the Laplacian-of-Gaussian (LoG) filter described in D. Marr and E. Hildreth, "Theory of Edge Detection", Proceedings of the Royal Society of London, Series B, Biological Sciences, Vol. 207, No. 1167, Feb. 29, 1980, pp. 187-217, may be used or variants and approximations thereof as described in S. Pei and J. Horng, "Design of FIR Bilevel Laplacian-of-Gaussian Filter", Signal Processing, No. 82, Elsevier Science B.V., 2002, pp. 677-691.

The disparity estimation component 214 receives the rectified, filtered left and right images and generates a disparity image of the stereo image. As part of the processing performed to generate the disparity image, the disparity estimation component 214 may perform SGM with lossless image decomposition as described herein. The operation of the disparity estimation component is described in more detail in reference to FIG. 3.

The disparity refinement component 216 performs processing to refine the disparity image as it is expected that some part of the disparity image may be incorrect. Any suitable refinement technique or techniques may be used. For example, a disparity confidence measure such as the one described in F. Mroz and T. Breckon, "An Empirical Comparison of Real-Time Dense Stereo Approaches for Use in the Automotive Environment," EURASIP Journal on Image and Video Processing, Aug. 16, 2012, pp. 1-40, may be utilized to identify and correct such regions. In another example, a median filter with a small window, e.g., 3×3, may be applied to smooth and remove irregularities such as outliers and peaks. In another example, interpolation may be performed to remove small holes in the disparity image. In another example, sub-pixel interpolation may be performed to increase the accuracy of the disparity image. Some suitable disparity refinement techniques that may be used are described in Hirschmüller 2008.

The application component 218 receives the disparity image and performs any additional processing needed for the particular application. The application component 218 may implement any application or applications that rely on a three-dimensional (3D) representation of a scene. For example, the application component 218 may be an automotive forward collision warning application that calculates how far an object is from the vehicle, tracks the object over time to determine if the vehicle is rapidly approaching it, and warns the driver of an impending collision. In another example, the application component 218 may be an automotive pedestrian detection application. In another example, the application component 218 may be a 3D video conference call application that supports background replacement. In another example, the application component 218 may be a 3D person tracking application.

Figure 3:
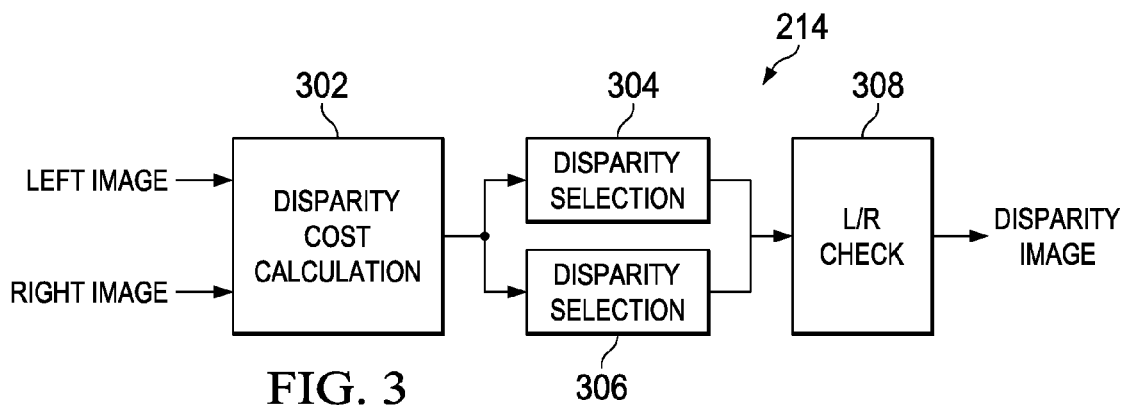
FIG. 3 is a block diagram of a disparity estimation component in the stereo image processing system of FIG. 2.

FIG. 3 is a block diagram of the disparity estimation component 214 of FIG. 2. The disparity estimation component 214 includes a disparity cost calculation component 302, left and right disparity selection components 304, 306, and a left/right (L/R) check component 308. The disparity cost calculation component 302 performs a method for SGM with lossless image decomposition to generate left and right aggregated disparity costs from the left and right rectified, filtered images. This method is described in detail in reference to the flow diagram of FIG. 4. The method is performed twice, once with the left image as the base image and the right image as the match image to generate the left aggregated disparity costs, and once with the right image as the base image and the left image as the match image to generate the right aggregated disparity costs.

The left and right disparity selection components 304, 306 receive the respective left and right aggregated disparity costs and generate, respectively, a left disparity image and a right disparity image. As is explained in more detail herein, the left aggregated disparity costs include multiple aggregated disparity costs per pixel position in the stereo image, one per each disparity considered. The same is true of the right aggregated disparity costs. The left disparity selection component 304 generates the left disparity image by selecting for each pixel position p the disparity d having the minimum aggregated cost of the left aggregated disparity costs, i.e., $\min_d S$ (p,d). The right disparity selection component 306 similarly generates the right disparity image from the right aggregated disparity costs. Any suitable search strategy may be used to locate the disparity with the minimum aggregated cost for a pixel location. For example, a Fibonacci search with a suitable starting value may be used. The suitable starting value may be, for example, a predetermined value, a random guess, or the disparity selected for the same pixel location in the previous stereo image.

The L/R check component 308 generates a single disparity image from the left and right disparity images. In general, the L/R check component 308 performs a consistency check to determine occlusions and false matches based on the assumption that any point in the left image has a single match in the right image. As shown in Eq. 7, to generate the single disparity image, each disparity $D_{pb}$ at each pixel location p of the left disparity image is compared with its corresponding disparity $D_{mq}$ in the right disparity image. If the absolute value of the difference between the two disparities is less than or equal to 1, the pixel location in the single disparity image is set to the disparity $D_{pb}$; otherwise, the pixel location is marked as invalid. The result is that occlusions are removed without affecting the valid matches.

$$Dp = \begin{cases} D_{bp} & \text{if } |D_{bp} - D_{mq}| \le 1 \\ D_{inv} & \text{otherwise} \end{cases} \quad (3)$$

Figure 4:
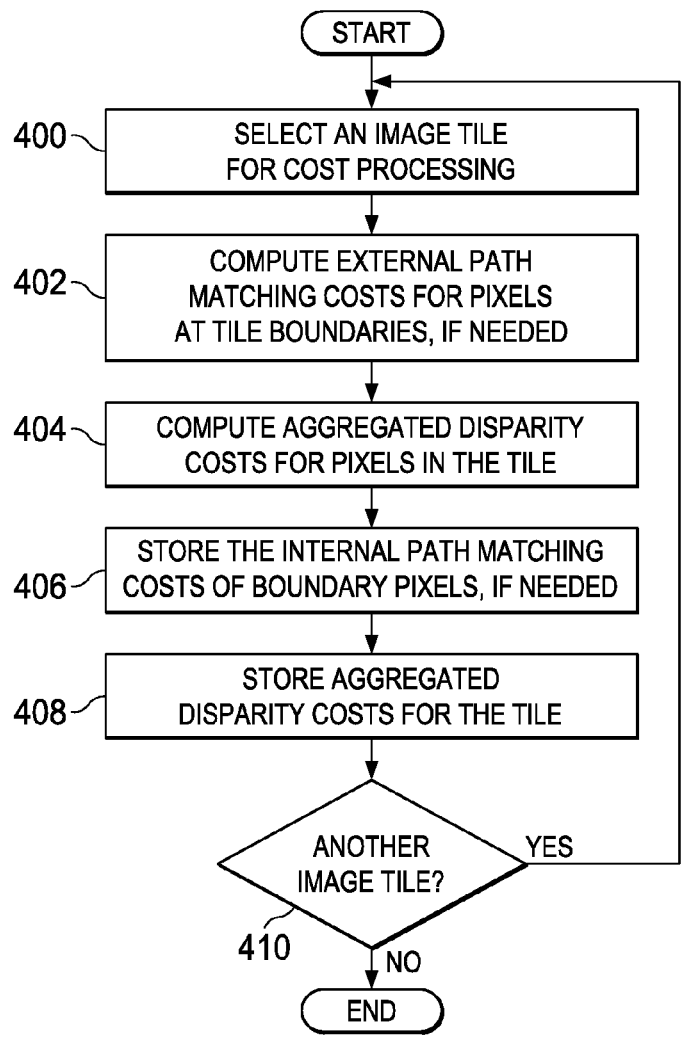
FIG. 4 is a flow diagram of a method for disparity cost calculation that may be performed by a disparity cost calculation component of the disparity estimation component of FIG. 3, FIGS. 5A and 5B are examples.

FIG. 4 is a flow diagram of a method for SGM with lossless image decomposition that is performed by the disparity cost calculation component 302 of FIG. 3. The method takes as input a base image and a match image of a stereo image. The base image may be the left image of the stereo image and the match image may be the right image or vice versa. The output of the method is a set of aggregated disparity costs for each pixel location in the stereo image, one for each disparity considered for the pixel location. As is well known, in SGM, a range of disparities 0≤d≤dmax may be considered for each pixel location. The range of disparities and/or the disparities considered within a given range may vary. For example, the range of disparities and/or the disparities considered within the range may be application specific. For example, the range of possible disparities, i.e., the value of $d_{max}$, may depend on the positioning and other capabilities of the imaging components 202, 204 (see FIG. 2). A particular application may need the accuracy of computing the aggregated disparity cost for every integer value of d while another application may need less accuracy, and may choose, for example, to compute the aggregated disparity cost for the even disparity values and/or to decrease the range.

As was previously explained, for SGM, a matching cost C(p,d) is determined for each pixel p in the base image for each disparity d. Any suitable technique for computing the matching costs may be used in embodiments of the method. For example, the matching cost computation may be based on absolute minimum difference in intensities or mutual information (MI) as described in Hirschmüller. In another example, the matching cost computation may be based on the census transform as described in R. Azbih and J. Woodfill, "Non-parametric Local Transforms for Computing Visual Correspondence," Proceedings of European Conference on Computer Vision, Stockholm, Sweden, May 1994, pp. 151-158.

The base image is divided into tiles for computation of the aggregated disparity costs. Any suitable tile size may be used. For example, the size of a tile and the number of tiles may be dependent on the size of the stereo image and the size of available on-chip memory. In some embodiments, such as in an embedded system, the tile size may be determined such that a tile of the base image and any intermediate computation results may be maintained in on-chip memory until the aggregated disparity costs for the pixels in the tile are computed. The division of an image into tiles may be in both or one of the horizontal and vertical directions. For example, a tile may be one horizontal line and an image may be partitioned into as many tiles as the number of horizontal lines. For purposes of path matching cost computations, the boundary pixels between neighboring tiles are shared.

The method is explained in reference to the simple example image decomposition of FIGS. 5A and 5B, which assumes that the base image is decomposed into four tiles 500, 502, 504, 506. The example also assumes that a maximum of eight paths, left, right, top, bottom, top left, bottom left, top right, and bottom right, are used for the path matching cost computations at each pixel location. More or fewer paths may be used in embodiments of the invention. For example purposes, a disparity range 0≤d≤128 is assumed.

Referring now to FIG. 4, a tile of the base image is selected 400 for cost processing, i.e., for generation of the aggregated disparity costs for the pixels in the tile. Any suitable tile processing order may be used. The order of tile processing may be, for example, left to right across tile rows. In the example of FIGS. 5A and 5B, assuming this processing order, the tile processing order is upper left tile 500, upper right tile 502, bottom left tile 504, and bottom right tile 506.

The external path matching costs for pixels at the boundaries of the tile are computed 402, if needed. As can be seen in FIG. 5A, some of the paths for boundary pixels extend outside the tile. These paths are referred to as the external paths of a boundary pixel. In the example of FIG. 5A, the external paths for pixels at the bottom boundary of tile 500 are the bottom, bottom left, and bottom right paths and the external paths for the pixels at the right boundary of tile 500 are the right, top right, and bottom left paths. For the right bottom corner boundary pixel of tile 500, the external paths are the bottom, bottom left, right, and top right paths.

For the first tile, e.g., tile 500, external path matching costs are computed for all boundary pixels of the tile. Each of the external paths of a boundary pixel may also form part of path for one or more internal pixels of the tile as the paths extend from the edge of the image to a pixel. For example, as illustrated in FIG. 5A, the bottom left external path of boundary pixel 512 forms part of the bottom left path of pixel 510 and the top right path of boundary pixel 514 forms part of the top right path of pixel 510. As is explained in more detail below, it may not be necessary to compute external path matching costs for some or all of the boundary pixels of subsequent tiles as these costs may be previously computed and stored during the cost processing of neighboring tiles.

The path matching costs for an external path r for a boundary pixel p for each disparity d may be computed as per Eq. 1 above. Given the 129 disparities in the disparity range, 129 path matching costs for each external path of a boundary pixel are computed and stored. Note that these computations require the computation of matching costs for the boundary pixel for each disparity and for each pixel along the external paths for each disparity. In some embodiments, the computed path matching costs may be stored in the on-chip memory. In some embodiments, the computed path matching costs may be stored in off-chip memory and read back into the on-chip memory for the computation of aggregated disparity costs for the tile.

The aggregated disparity costs for the internal pixels in the tile are then computed 404. The aggregated disparity costs for any boundary pixels of the tile which have not been previously computed are also computed. While boundary pixels between tiles are shared for purposes of path matching cost computation, the aggregated disparity costs for boundary pixels at each boundary between neighboring tiles are computed one time. For example, given the tile decomposition of FIGS. 5A and 5B, the aggregated disparity costs for the boundary pixels shared by tiles 500 and 502 and the boundary pixels shared by tile 500 and 504 are computed when aggregated disparity costs are computed for tile 500. The aggregated disparity costs for the boundary pixels shared by tiles 502 and 506 are computed when aggregated disparity costs are computed for tile 502. The aggregated disparity costs for the boundary pixels shared by tiles 504 and 506 are computed when aggregated disparity costs are computed for tile 504.

To compute the aggregated disparity costs, initially the matching costs of each pixel in the tile may be computed and stored. Then, the path matching costs for each of the paths r for each of the pixels p for each disparity d may be computed as per Eq. 1 above. For those pixels having a path that extends through a boundary pixel to an edge of the image, e.g., pixel 510, the appropriate external path matching cost computed for the boundary pixel is used in the path matching cost computation.

For most pixels in the tile, given the example assumption of eight paths, eight path matching costs are computed for each of the disparities in the disparity range. Note that all paths may not be available for all pixels. For example, some of the paths are not available for the pixels at the left and top boundaries of tile 500. As is illustrated in FIG. 5B for tile 500, the information needed to compute the path matching costs is contained within the tile or has been previously computed for the boundary pixels. Note that for the boundary pixels, the path matching costs for the external paths of those pixels is previously computed. Thus, there is no need to compute the path matching costs for these paths. Finally, the aggregated disparity costs for each pixel in the tile for each disparity are computed as per Eq. 2. If aggregated costs are being computed for any boundary pixels, the previously computed path matching costs for the external paths are used in computing the aggregated disparity costs. Given the 129 disparities in the range, 129 aggregated disparity costs are computed for each pixel.

If needed, the internal path matching costs computed for boundary pixels are stored for use in aggregated disparity computations for neighboring tiles as the internal paths of boundary pixels in the current tile are external paths for the same boundary pixels in a neighboring tile. The left and right path matching costs for pixels on a horizontal boundary and the top and bottom path pixel cost for pixels on a vertical boundary are also stored for use in aggregated disparity computations for neighboring tiles. Note that the left and right paths of pixels on a horizontal boundary and the top and bottom paths of pixels on a vertical boundary are considered to be external paths for both neighboring tiles sharing these boundary pixels. In some embodiments, such as embedded systems, these path matching costs are stored in off-chip memory until needed for aggregated disparity computations in the relevant neighboring tile.

For a given tile, these costs may not need to be stored. For example, given the tile decomposition of FIGS. 5A and 5B, the internal path matching costs and the top and bottom path matching costs for the boundary pixels on the right boundary of tile 500 are stored for use in aggregated disparity computations for tile 502. The internal path matching costs and the left and right path matching costs for the boundary pixels on the bottom boundary of tile 500 are also stored for use in aggregated disparity computations for tile 504. When the method is performed for tile 502, the internal path matching costs and the left and right path matching costs for the boundary pixels on the bottom boundary of tile 502 are stored for use in aggregated disparity computations for tile 506. There is no need to retain the boundary pixel path matching costs for the left boundary of tile 502. When the method is performed for tile 504, the internal path matching costs and the top and bottom path matching costs for the boundary pixels on the right boundary of tile 504 are stored for use in aggregated disparity computations for tile 506. When the method is performed for tile 506, no path matching costs for boundary pixels are stored.

Referring again to FIG. 4, the computed aggregated disparity costs for the tile are also stored 408. In some embodiments, such as embedded systems, these aggregated disparity costs are stored in off-chip memory. The method is then repeated for another image tile, if any 410. For the subsequent tiles, some or all of the external path matching costs for boundary pixels may not need to be computed at step 2. For example, given the image decomposition of FIGS. 5A and 5B, for tile 502, the path matching costs for the external paths of the boundary pixels between tile 502 and tile 506 need to be computed but the external path matching costs for the boundary pixels between tile 500 and 502 are stored in memory and need not be recomputed. For tile 504, the path matching costs for the external paths of the boundary pixels between tile 504 and tile 506 need to be computed but the external path matching costs for the boundary pixels between tiles 500 and 504 are stored in memory and need not be recomputed. For tile 506, no external path matching costs need to be computed for boundary pixels as the external path matching costs for the boundary pixels between tiles 502 and 506 and tiles 504 and 506 are stored in memory.

Figure 6:
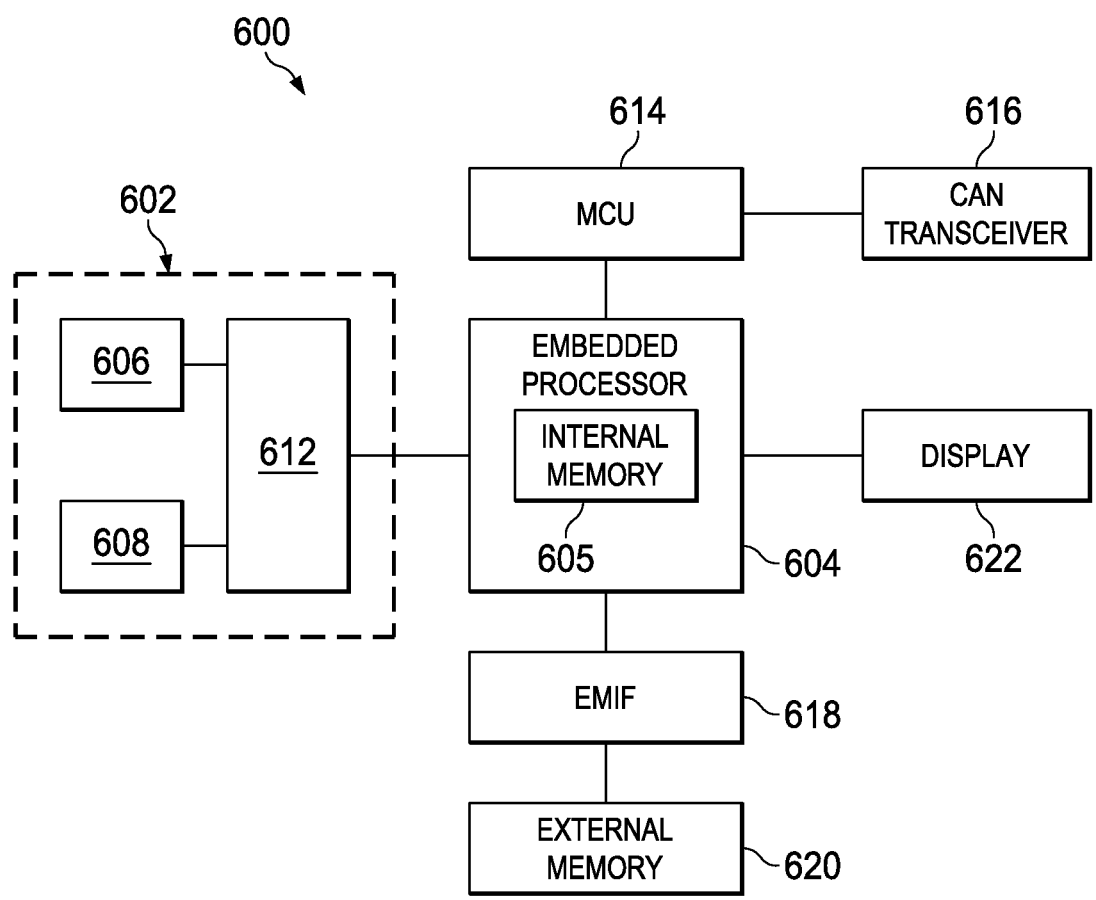
FIG. 6 is a block diagram of an automotive vision control system.

FIG. 6 is a block diagram of an embedded automotive vision control system 600 suitable for use in a vehicle that may be configured to generate disparity images using SGM with lossless image decomposition as describe herein. The stereoscopic imaging system 602 includes left and right imaging components 606, 608 and a controller component 612 for capturing the data needed to generate a stereoscopic video sequence. The imaging components 606, 608 may be imaging sensor systems arranged to capture image signals of a scene from a left viewpoint and a right viewpoint. That is, the imaging sensor system in the left imaging component 606 may be arranged to capture an image signal from the left viewpoint, i.e., a left analog image signal, and the imaging sensor system in the right imaging component 608 may be arranged to capture an image signal from the right view point, i.e., a right analog image signal. Each of the imaging sensor systems includes a lens assembly, a lens actuator, an aperture, and an imaging sensor. The stereoscopic imaging system 602 also includes circuitry for controlling various aspects of the operation of the system, such as, for example, aperture opening amount, exposure time, etc. The controller module 612 includes functionality to convey control information from the embedded processor 604 to the imaging sensor systems 606, 608, to convert the left and right analog image signals to left and right digital image signals, and to provide the left and right digital image signals to the embedded processor 604 for further processing.

Software instructions implementing the functionality of the rectification, filtering, disparity estimation, and disparity refinement components of FIG. 2 may be stored in the external memory 620 and executed by the embedded processor to generate disparity images for the stereoscopic images received from the stereoscopic imaging system 602. Software instructions implementing a driver assistance application needing 3D vision information such as forward collision warning, visual parking and/or navigation assistance, automatic braking control, etc., may also be stored in the external memory 620 and executed on the embedded processor. The software instructions may be initially stored in a computer-readable medium and loaded and executed by the embedded processor 604. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

The embedded processor 604 may be any suitable processor that provides the computation performance needed for stereo vision processing, such as, for example, a digital signal processor or a general purpose processor. The internal memory 605 may be any suitable memory design, e.g., static random access memory (SRAM). The embedded processor 604 is coupled to external memory 620 via an external memory interface (EMIF) 618. The embedded processor 604 included functionality to move instructions and/or data between the external memory 620 and the internal memory 605 via the EMIF 618 as needed for stereo image processing, e.g., generation of disparity images, and application processing.

The external memory 620 may be any suitable memory design may be used. For example, the external memory 620 may include DRAM such as synchronous DRAM (SDRAM) or double data rate DRAM (DDR DRAM), flash memory, a combination thereof, or the like.

The display 622 may be a display device capable of displaying stereo images or a display device capable of displaying two-dimensional images. In the latter case, images captured by one of the imaging components 202, 204 are displayed on the display 622. The information provided on the display depends on the particular application or applications of the system 600. For example, the display 622 may be used by a parking assistance application.

The microcontroller (MCU) 614 may be a general purpose microcontroller configured to handle system control functions such as steeper motors in real time as well as communication with other modules in the vehicle. The controller area network (CAN) transceiver provides a network protocol for serial communication with various control modules in the vehicle.

In operation, the embedded processor 604 may receive a sequence of left and right digital images of a stereo video sequence from the stereoscopic imaging system 602, execute software instructions stored in the external memory 605 to perform rectification, filtering, disparity estimation, and disparity refinement as previously described herein to generate disparity images, and provide the disparity images to one or more driver assistance applications. The left and right images are stored in the external memory 620 and portions of the images are read into the internal memory 605 as needed for the generation of the disparity images.

A driver assistance application may further process the disparity images to provide vision based assistance to a driver. For example, the driver assistance application may derive information about the scene from the disparity images that allows it to detect that a collision with an object is imminent. The driver assistance application may then communicate with the MCU 614 to request that the MCU 614 interact with a brake control module to slow the vehicle down and may also cause act a visual alarm to be displayed on scene shown in the display 622 and/or cause an audible alarm to be initiated.

As part of the generation of the disparity images, an embodiment of the method for SGM with lossless image decomposition implemented in the software instructions may be executed by the embedded processor 604. For the SGM computations, the embedded processor 604 may divide the base image into tiles of an appropriate size that permits a tile and some or all of the intermediate results of computing the aggregated disparity costs for the tile to be retained in the internal memory 605 while the aggregated disparity costs are generated.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, rather than generating a left disparity image and a right disparity image as previously described, in some embodiments, the right disparity image may be determined from the same costs used for determining the left disparity image. The determination of a right disparity image in this manner is described in Hirschmüller and Hirschmüller 2008.

In another example, rather than performing rectification, filtering, and disparity selection in parallel as depicted herein, theses operations may be performed serially. For example, there may be a single rectification component and a single filtering component for rectifying and filtering the left and right images.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for disparity cost computation for a stereoscopic image, the method comprising:
   computing path matching costs for external paths of at least some boundary pixels of a tile of a base image of the stereoscopic image, wherein a boundary pixel is a pixel at a boundary between the tile and a neighboring tile in the base image;
   storing the path matching costs for the external paths;
   computing path matching costs for pixels in the tile, wherein the stored path matching costs for the external paths of the boundary pixels are used in computing some of the path matching costs of some of the pixels in the tile; and
   computing aggregated disparity costs for the pixels in the tile, wherein the path matching costs computed for each pixel are used to compute the aggregated disparity costs for the pixel.

2. The method of claim 1, further comprising storing path matching costs computed for internal paths of boundary pixels of the tile, wherein the internal paths are external paths of the boundary pixels for the neighboring tile.

3. The method of claim 2, further comprising computing path matching costs for pixels in the neighboring tile, wherein the stored path matching costs for the internal paths are used in computing some of the path matching costs of some of the pixels in the neighboring tile.

4. The method of claim 1, wherein a size of the tile is a size that allows the tile to be retained in an on-chip memory for the computing path matching costs and the computing aggregated disparity costs.

5. The method of claim 1, further comprising:
   computing path matching costs for internal paths of all boundary pixels of the tile; and
   computing aggregated disparity costs for the at least some boundary pixels using the computed path matching costs for the internal paths of the at least some boundary pixels and the stored path matching costs for external paths of the at least some boundary pixels.

6. An apparatus comprising:
   means for capturing a stereoscopic image; and
   means for computing aggregated disparity costs for a base image of the stereoscopic image,
   wherein the means for computing aggregated disparity costs is configured to:
       compute path matching costs for external paths of at least some boundary pixels of a tile of the base image, wherein a boundary pixel is a pixel at a boundary between the tile and a neighboring tile in the base image;
       store the path matching costs for the external paths;

compute path matching costs for pixels in the tile, wherein the stored path matching costs for the external paths of the boundary pixels are used in computing some of the path matching costs of some of the pixels in the tile; and compute aggregated disparity costs for the pixels in the tile, wherein the path matching costs computed for each pixel are used to compute the aggregated disparity costs for the pixel.

7. The apparatus of claim 6, wherein the means for computing is further configured to store path matching costs computed for internal paths of boundary pixels of the tile, wherein the internal paths are external paths of the boundary pixels for the neighboring tile.

8. The apparatus of claim 7, wherein the means for computing is further configured to compute path matching costs for pixels in the neighboring tile, wherein the stored path matching costs for the internal paths are used in computing some of the path matching costs of some of the pixels in the neighboring tile.

9. The apparatus of claim 6, further comprising an on-chip memory, wherein a size of the tile is a size that allows the tile to be retained in the on-chip memory for the computation of path matching costs and the computation of aggregated disparity costs.

10. The apparatus of claim 6, wherein the means for computing is further configured to:
   compute path matching costs for internal paths of all boundary pixels of the tile; and
   compute aggregated disparity costs for the at least some boundary pixels using the computed path matching costs for the internal paths of the at least some boundary pixels and the stored path matching costs for external paths of the at least some boundary pixels.

11. The apparatus of claim 6, wherein the apparatus is an automotive vision control system.

12. A non-transitory computer readable medium storing software instructions that, when executed by a processor, cause the performance of a method for disparity cost computation for a stereoscopic image, the method comprising:

computing path matching costs for external paths of at least some boundary pixels of a tile of a base image of the stereoscopic image, wherein a boundary pixel is a pixel at a boundary between the tile and a neighboring tile in the base image;

storing the path matching costs for the external paths;

computing path matching costs for pixels in the tile, wherein the stored path matching costs for the external paths of the boundary pixels are used in computing some of the path matching costs of some of the pixels in the tile; and computing aggregated disparity costs for the pixels in the tile, wherein the path matching costs computed for each pixel are used to compute the aggregated disparity costs for the pixel.

13. The computer readable medium of claim 12, wherein the method further comprises storing path matching costs computed for internal paths of boundary pixels of the tile, wherein the internal paths are external paths of the boundary pixels for the neighboring tile.

14. The computer readable medium of claim 13, wherein the method further comprises computing path matching costs for pixels in the neighboring tile, wherein the stored path matching costs for the internal paths are used in computing some of the path matching costs of some of the pixels in the neighboring tile.

15. The computer readable medium of claim 12, wherein a size of the tile is a size that allows the tile to be retained in an on-chip memory for the computing path matching costs and the computing aggregated disparity costs.

16. The computer readable medium of claim 12, wherein the method further comprises:
   computing path matching costs for internal paths of all boundary pixels of the tile; and
   computing aggregated disparity costs for the at least some boundary pixels using the computed path matching costs for the internal paths of the at least some boundary pixels and the stored path matching costs for external paths of the at least some boundary pixels.

* * * * *